(12) United States Patent
Tomita

(10) Patent No.: US 8,159,607 B2
(45) Date of Patent: Apr. 17, 2012

(54) VIDEO SIGNAL DISPLAY SYSTEM, VIDEO SIGNAL REPRODUCING APPARATUS, AND VIDEO SIGNAL DISPLAY METHOD

(75) Inventor: Masami Tomita, Tokyo (JP)

(73) Assignee: Sony Corporation (JP)

( * ) Notice: Subject to any disclaimer, the term of this patent is extended or adjusted under 35 U.S.C. 154(b) by 499 days.

(21) Appl. No.: 12/455,328

(22) Filed: Jun. 1, 2009

(65) Prior Publication Data

US 2009/0310017 A1 Dec. 17, 2009

(30) Foreign Application Priority Data

Jun. 11, 2008 (JP) ................ P2008-153090

(51) Int. Cl.
*H04N 7/01* (2006.01)
*H04N 11/20* (2006.01)
(52) U.S. Cl. ........ 348/446; 348/448; 348/452; 348/458; 348/459
(58) Field of Classification Search .................. 348/446, 348/448, 452, 458, 459
See application file for complete search history.

(56) References Cited

U.S. PATENT DOCUMENTS

| 5,633,687 | A | * | 5/1997 | Bhayani et al. | 348/441 |
| 5,850,264 | A | * | 12/1998 | Agarwal | 348/469 |
| 7,463,306 | B1 | * | 12/2008 | Grzibek | 348/446 |
| 7,495,646 | B2 | * | 2/2009 | Kawabe et al. | 345/95 |
| 2007/0273788 | A1 | * | 11/2007 | Ishii et al. | 348/448 |

* cited by examiner

*Primary Examiner* — Dominic D Saltarelli
(74) *Attorney, Agent, or Firm* — Lerner, David, Littenberg, Krumholz & Mentlik, LLP

(57) ABSTRACT

A video signal display system includes: a reproducing apparatus including a decoder that decodes input video data to produce a video signal, an IP converter that, when the video signal produced by the decoder is an interlaced video signal, converts the interlaced video signal into a progressive video signal, a pseudo-interlacing unit that performs pseudo-interlacing in which the progressive video signal converted by the IP converter undergoes pseudo-interlacing so that the progressive video signal is converted into a pseudo-interlaced signal, and a first controller; and a display apparatus including a display processor that carries out a display process for displaying a video signal, and a display that can at least display the video signal that has undergone the display process in the display processor.

6 Claims, 2 Drawing Sheets

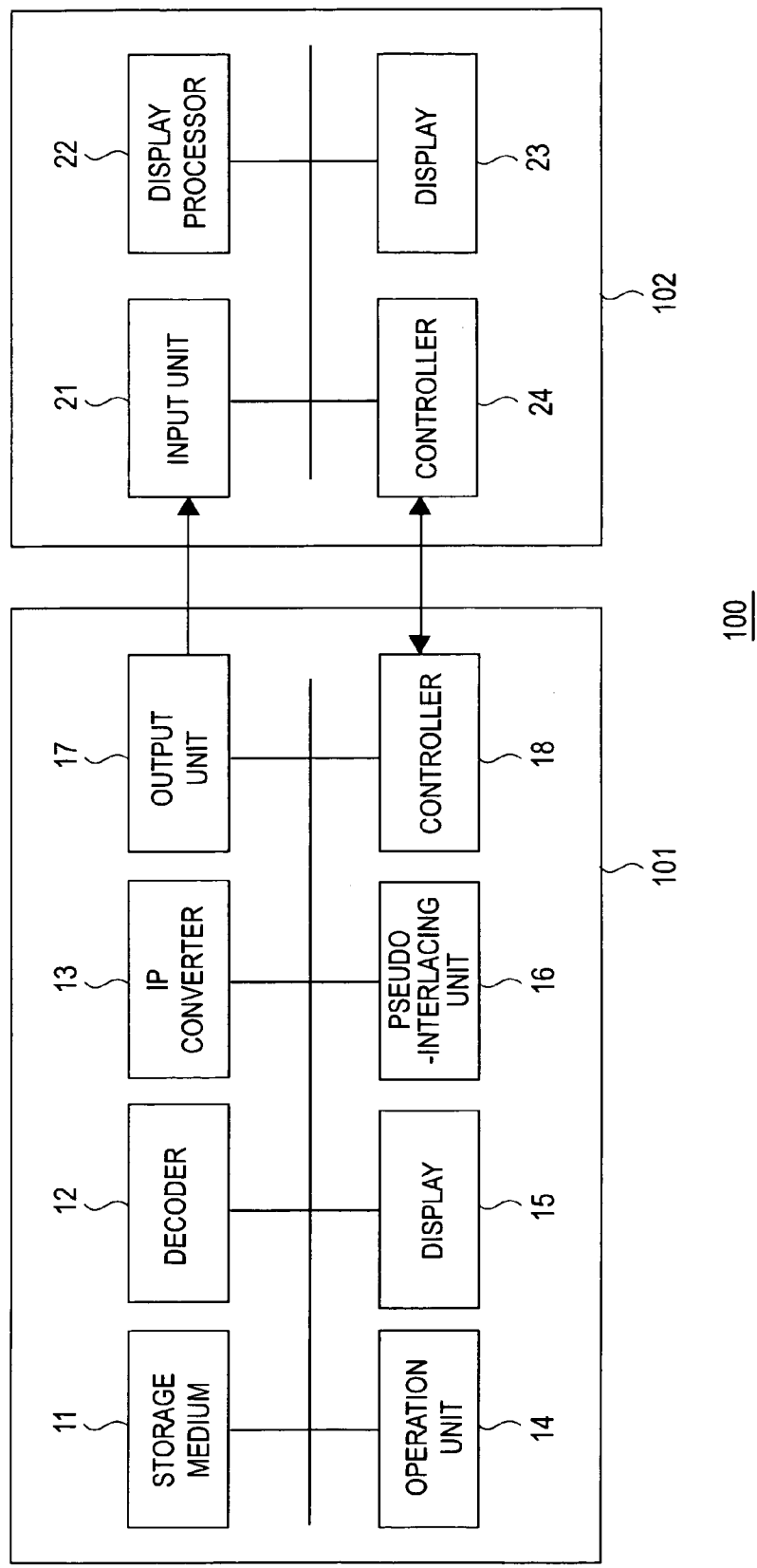

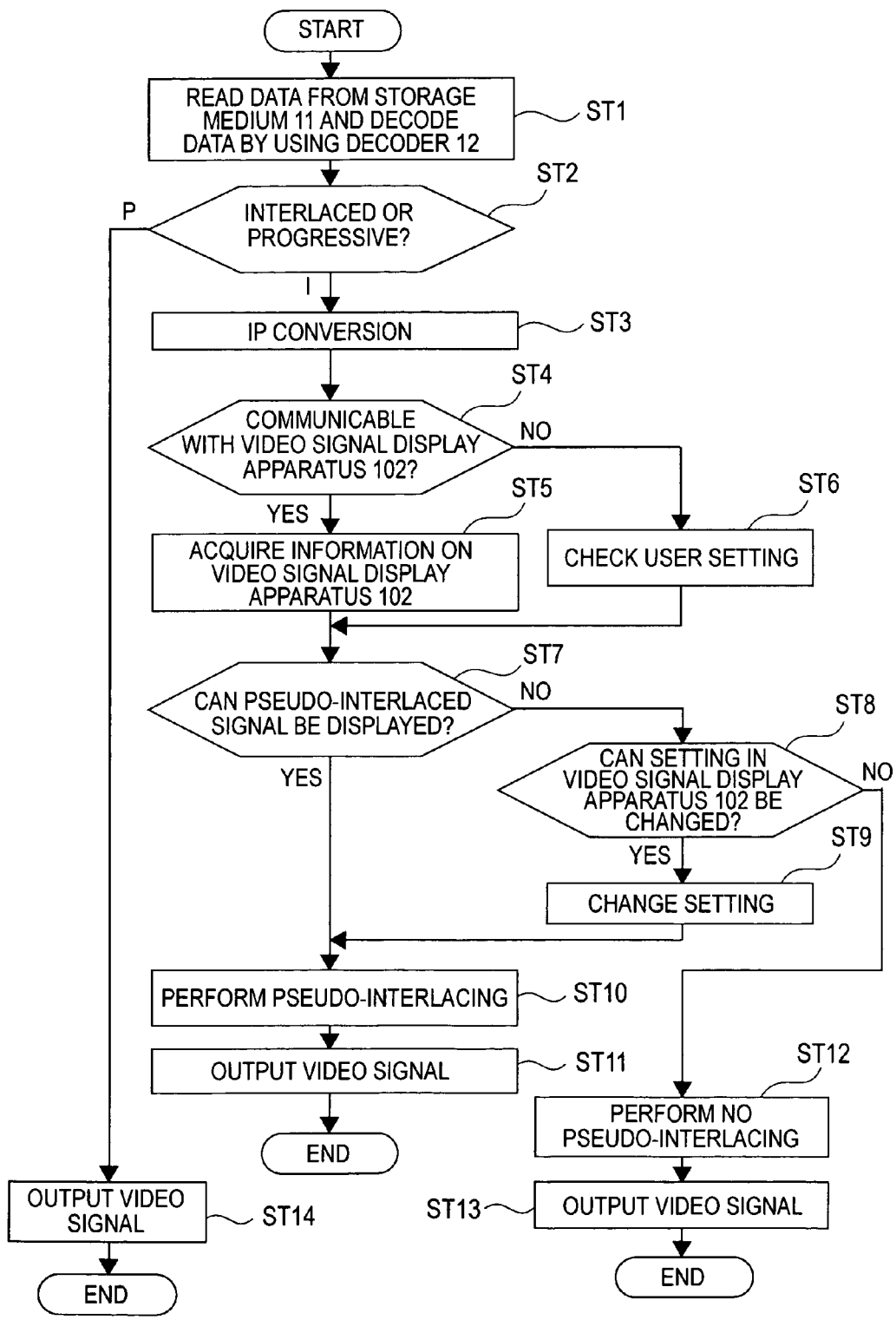

VIDEO SIGNAL DISPLAY SYSTEM, VIDEO SIGNAL REPRODUCING APPARATUS, AND VIDEO SIGNAL DISPLAY METHOD

The present application claims priority from Japanese Patent Application No. JP 2008-153090 filed in the Japanese Patent Office on Jun. 11, 2008, the entire content of which is incorporated herein by reference.

BACKGROUND OF THE INVENTION

1. Field of the Invention

The present invention relates to a video signal display system, a video signal reproducing apparatus, and a video signal display method for displaying an interlaced video signal as if it were a progressive video signal on a display apparatus capable of displaying a progressive video signal.

2. Description of the Related Art

Video signal formats are classified into an interlace format based on interlace scanning and a progressive format based on progressive scanning.

The interlace scanning is a format in which a single video screen is formed of scan lines and every other scan line thereof is skipped. In this format, when the scan of every other scan line in a single screen is completed, the skipped scan lines are then sequentially scanned. Performing interlace scanning twice therefore produces a single display screen (single frame). That is, a single frame includes two screens, first and second fields in each of which every other scan line is skipped.

On the other hand, in the progressive scanning, no scan line is skipped, but the scan lines are sequentially scanned one by one.

Interlaced video signals are typically used in television broadcast (in digital television broadcast, however, progressive video signals are used in some cases).

To display an interlaced video signal on a video signal display apparatus capable of displaying only progressive video signals, the interlaced video signal needs to be converted into a progressive video signal.

To convert an interlaced video signal into a progressive video signal, for example, motions in the preceding and following images are analyzed to complement the skipped scan lines. In an image obtained by converting the interlace format into the progressive format (hereinafter referred to as IP conversion), however, combining two fields causes a moving portion to be unsharpened (hereinafter referred to as a motion blur).

To eliminate the motion blur generated by IP conversion, for example, a progressive video signal is displayed as if it were an interlaced video signal. That is, IP-converting an interlaced video signal and then handling the converted progressive signal as if it were an interlaced video signal allow a video signal display apparatus capable of displaying only progressive video signals to display the converted progressive signal with no motion blur. An example of a method for displaying a progressive video signal as if it were an interlaced video signal involves dividing a single frame in a progressive signal into two fields, inserting black odd-numbered lines in one of the fields, and inserting black even-numbered lines in the other one of the fields. Handling a progressive video signal as if it were an interlaced video signal this way is hereinafter referred to as pseudo-interlacing, and a pseudo-interlaced video signal is called a pseudo-interlaced signal.

SUMMARY OF THE INVENTION

There is a problem that does not occur when a video signal display apparatus performs pseudo-interlacing based on an input progressive signal, but occurs when a video signal reproducing apparatus produces a pseudo-interlaced signal based on an input progressive signal and the produced pseudo-interlaced video signal is sent to a progressive video display apparatus and displayed thereon.

When the video signal display apparatus includes a pseudo-interlacing unit that carries out pseudo-interlacing, the pseudo-interlacing unit informs a display of information indicative of which field has been produced from which frame and which fields are reproduced in which order. In this case, no display-related problem occurs. However, when the video signal reproducing apparatus produces a pseudo-interlaced signal and sends it to the display apparatus and the display apparatus displays the pseudo-interlaced signal, the display apparatus is not informed of information indicative of which field has been produced from which frame and which fields are reproduced in which order. In this case, a display-related problem may occur in some cases.

Thus, it is desirable to provide a video signal display system, a video signal reproducing apparatus, and a video signal display method that suffer from no display-related problem when a display apparatus displays a pseudo-interlaced signal produced by a reproducing apparatus.

A video signal display system according to a first embodiment of the invention includes a reproducing apparatus including a decoder that decodes input video data to produce a video signal, an IP converter that, when the video signal produced by the decoder is an interlaced video signal, converts the interlaced video signal into a progressive video signal, a pseudo-interlacing unit that performs pseudo-interlacing in which the progressive video signal converted by the IP converter undergoes pseudo-interlacing so that the progressive video signal is converted into a pseudo-interlaced signal, and a first controller; and a display apparatus including a display processor that carries out a display process for displaying a video signal, and a display that can at least display the video signal that has undergone the display process in the display processor. The first controller acquires information indicative of whether or not the display processor carries out a display process using a plurality of frames in the video signal in the temporal direction, and controls the pseudo-interlacing unit not to perform the pseudo-interlacing when the display processor carries out the process using a plurality of frames in the video signal in the temporal direction, whereas controlling the pseudo-interlacing unit to perform the pseudo-interlacing when the display processor does not carry out any display process using a plurality of frames in the video signal in the temporal direction.

A video signal reproducing apparatus according to a second embodiment of the invention includes a decoder that decodes input video data to produce a video signal, an IP converter that, when the video signal produced by the decoder is an interlaced video signal, converts the interlaced video signal into a progressive video signal, a pseudo-interlacing unit that performs pseudo-interlacing in which the progressive video signal converted by the IP converter undergoes pseudo-interlacing so that the progressive video signal is converted into a pseudo-interlaced signal, and a controller. The controller, when connected to a display apparatus capable of carrying out a display process for displaying a video signal, acquires information indicative of whether or not the display apparatus carries out a display process using a plurality of frames in the video signal in the temporal direction, and controls the pseudo-interlacing unit not to perform the pseudo-interlacing when the display apparatus carries out the process using a plurality of frames in the video signal in the temporal direction, whereas controlling the pseudo-interlacing unit to perform the pseudo-interlacing when the display apparatus does not carry out any display process using a plurality of frames in the video signal in the temporal direction.

A video signal display method according to a third embodiment of the invention includes the steps of: decoding input video data to produce a video signal, converting the interlaced video signal into a progressive video signal when the video signal produced in the first step is an interlaced video signal, judging whether or not a display processor that carries out a display process for displaying a video signal carries out a display process using a plurality of frames in the video signal in the temporal direction, pseudo-interlacing the progressive video signal converted in the converting step so that the progressive video signal is converted into a pseudo-interlaced signal when the display processor is not judged to carry out any display process using a plurality of frames in the video signal in the temporal direction, and displaying the pseudo-interlaced signal converted in the pseudo-interlacing step.

It is desirable to provide a video signal display system, a video signal reproducing apparatus, and a video signal display method that suffer from no display-related problem when a display apparatus displays a pseudo-interlaced signal produced by a reproducing apparatus.

BRIEF DESCRIPTION OF THE DRAWINGS

FIG. 1 explains a video signal display system according to an embodiment of the invention; and FIG. 2 is a flowchart for explaining an example of the actions of a video signal reproducing apparatus 101 when it reproduces a video signal.

DESCRIPTION OF THE PREFERRED EMBODIMENTS

An embodiment of the invention will be described below.

FIG. 1 explains a video signal display system 100 according to an embodiment of the invention.

As shown in FIG. 1, the video signal display system 100 of the present embodiment includes a video signal reproducing apparatus 101 and a video signal display apparatus 102.

The video signal display system 100 shown in FIG. 1 is intended to display a video signal inputted to the video signal reproducing apparatus 101 on the video signal display apparatus 102 capable of displaying only progressive signals.

The video signal reproducing apparatus 101 includes a storage medium 11, a decoder 12, an IP converter 13, an operation unit 14, a display 15, a pseudo-interlacing unit 16, an output unit 17, and a controller 18 (corresponding to the first controller of an embodiment of the invention).

The storage medium 11 is an optical drive that rotates a DVD (Digital Versatile Disc), a BD (Blu-ray Disc), or any other optical medium and reads data therefrom, an HDD (Hard Disc Drive), or any other storage unit. Video data are read from the storage medium 11 and transmitted to the decoder 12.

The decoder 12 decodes the video signal read from the storage medium 11. Since the video data stored on the storage medium 11 are compressed and coded in most cases, the compressed video signal is decoded in accordance with the compression method into an uncompressed and decoded video signal.

When the decoded video signal is an interlaced video signal, the video signal is outputted to the IP converter 13. When the decoded video signal is a progressive video signal, the video signal is outputted to the output unit 17.

The IP converter 13 performs IP conversion in which the interlaced video signal decoded by the decoder 12 is converted into a progressive video signal.

The operation unit 14 is an operation device that receives user operations. The operation unit 14 includes keys and buttons.

The display 15 is a liquid crystal display (LCD) or any other suitable display device. The display 15 displays, for example, operations performed through the operation unit 14 and actions of the video signal reproducing apparatus 101.

The pseudo-interlacing unit 16 performs pseudo-interlacing on the progressive signal inputted from the IP converter 13 under the control of the controller 18, which will be described later, and outputs a pseudo-interlaced signal.

The pseudo-interlacing produces a pseudo-interlaced progressive signal as described above. The pseudo-interlacing involves attenuating the signal level or increasing the black level of the even-numbered lines (scan lines) or odd-numbered lines in the input progressive signal. That is, interlaced signal-like, pseudo-field scanning is achieved by performing the process described above alternately on the even-numbered lines and the odd-numbered lines for each frame in the progressive signal.

The output unit 17 outputs the progressive signal that has undergone the pseudo-interlacing in the pseudo-interlacing unit 16 (hereinafter referred to as a pseudo-interlaced signal) or the progressive signal that has been inputted from the decoder 12 but has not undergone IP conversion in the IP converter 13 to the video signal display apparatus 102.

The controller 18 performs overall control of the actions of the components described above in the video signal reproducing apparatus 101.

The controller 18 also communicates with the video signal display apparatus 102, which will be described later, and acquires information indicative of whether or not the video signal display apparatus 102 can display a pseudo-interlaced signal (hereinafter referred to as pseudo-interlace display enabled/disabled information). Further, the controller 18 controls the pseudo-interlacing unit 16 to perform or not to perform the pseudo-interlacing in accordance with the pseudo-interlace display enabled/disabled information acquired from the video signal display apparatus 102 or the user's operation performed through the operation unit 14. The control of the controller 18 over the pseudo-interlacing unit 16 will be described later in detail.

The video signal display apparatus 102 includes an input unit 21, a display processor 22, a display 23, and a controller 24 (corresponding to the second controller of an embodiment of the invention), as shown in FIG. 1.

The input unit 21 acquires the pseudo-interlaced signal or the progressive signal outputted from the video signal reproducing apparatus 101.

The display processor 22 carries out display processes for displaying the pseudo-interlaced signal or the progressive signal acquired through the input unit 21 on the display 23, which will be described later.

The display processes carried out by the display processor 22 specifically include the following actions: For example, when the number of pixels in the video signal differs from the number of pixels displayable on the display 23, the video signal is scaled up or down so that it can be displayed. When the screen size (aspect ratio) differs between the video signal and the display 23, for example, the video signal is scaled up or down or stretched in the vertical or horizontal direction, or a letter box is displayed. When the display 23 is a liquid crystal display (LCD) or any other similar display, the display speed is doubled to eliminate an afterimage by computing motion information from the difference between the preceding and following images and creating an interpolated, intermediate image in accordance with the direction and magnitude of the motion. Noise reduction and other processes may also be performed.

The display processor 22 may be configured to be capable of choosing which process among the display processes described above is performed or is not performed and setting the choice accordingly under the control of the controller 24, which will be described later.

The display 23 is a liquid crystal display (LCD), an organic EL (Electro Luminescence) display, or any other suitable display device, and displays the pseudo-interlaced signal or the progressive signal processed by the display processor 22.

The controller 24 performs overall control of the actions of the components described above in the video signal display apparatus 102. The controller 24 also communicates with the controller 18 in the video signal reproducing apparatus 101 described above, and sends the pseudo-interlace display enabled/disabled information indicative of whether or not the video signal display apparatus 102 can display a pseudo-interlaced signal.

The pseudo-interlace display enabled/disabled information will now be described.

In the video signal display system 100 of the present embodiment, when the video signal obtained by decoding data read from the storage medium 11 is an interlaced video signal, the video signal reproducing apparatus 101 performs the IP conversion and pseudo-interlacing on the video signal and then outputs the resultant video signal to the video signal display apparatus 102. The video signal display apparatus 102 then carries out display processes according to the number of pixels and the screen size of the video signal before displaying the video signal.

The pseudo-interlacing involves, as described above, for example, lowering the brightness of the even-numbered lines and the odd-numbered lines alternately for each frame in a progressive signal as if it were an interlaced signal. Therefore, when the display processes performed by the video signal display apparatus 102 include a process using a plurality of frames in the temporal direction (such as double-speed display and noise reduction) and the process is performed on a pseudo-interlaced signal, the pseudo-interlaced signal may not be normally displayed.

To address the problem, the video signal reproducing apparatus 101 is configured to be capable of choosing and determining in advance whether or not the pseudo-interlacing is performed in accordance with whether or not the video signal display apparatus 102 carries out a display process using a plurality of frames in the temporal direction.

That is, the pseudo-interlace display enabled/disabled information indicates whether or not the display processor 22 carries out a display process using a plurality of frames in the temporal direction.

The controller 24 can also make display process setting of a display process carried out by the display processor 22 described above. That is, for example, when the display processor 22 can carry out a process using a plurality of frames in the temporal direction (such as double-speed display and noise reduction), which compromises the display of a pseudo-interlaced signal, the controller 24 can set the process in question to be or not to be carried out by the display processor 22. Further, the controller 24 can change the setting (for example, the setting in which the process in question may not be performed can be changed to the setting in which the process may be performed).

A description will be made of an example of the actions of the video signal reproducing apparatus 101, including the control of the controller 18 in the video signal reproducing apparatus 101 over whether or not the pseudo-interlacing unit 16 performs the pseudo-interlacing according to the operation performed through the operation unit 14.

FIG. 2 is a flowchart for explaining an example of the actions of the video signal reproducing apparatus 101 when it reproduces a video signal.

Step ST1:

Data are read from the storage medium 11, and the decoder 12 decodes the data to produce a video signal.

Step ST2:

The controller 18 judges whether the decoded video signal is an interlaced video signal or a progressive video signal.

When the video signal is an interlaced video signal, the control proceeds to the step ST3, whereas when the video signal is a progressive video signal, the control proceeds to the step ST14.

Step ST3:

The IP converter 13 converts the interlaced video signal into a progressive video signal.

Step ST4:

The controller 18 judges whether or not it can communicate with the controller 24 in the video signal display apparatus 102. When the controller 18 judges that it can communicate with the controller 24, the control proceeds to the step ST5, otherwise the control proceeds to the step ST6.

Step ST5:

The controller 18 communicates with the controller 24 and acquires information on the video signal display apparatus 102. The information on the video signal display apparatus 102 indicates whether or not the video signal display apparatus 102 can display a pseudo-interlaced signal, that is, whether or not the display processor 22 performs a display process using a plurality of frames in the temporal direction.

The controller 18 may communicate with the controller 24 either by using a dedicated communication line or by using a communication line that the output unit 17 in the video signal reproducing apparatus 101 uses to output a video signal to the video signal display apparatus 102. For example, the controller 18 can communicate with the controller 24 without a dedicated communication line by connecting the video signal reproducing apparatus 101 to the video signal display apparatus 102 through an interface capable of sending and receiving a control signal and a video signal at the same time, such as HDMI (High-Definition Multimedia Interface). In particular, the communication between the controller 18 and the controller 24 described above can be achieved by using vendor specific commands (control commands that a vendor can freely set) in an inter-apparatus control capability called CEC (Consumer Electronics Control), which has been added to the HDMI standard version 1.2 and later.

Step ST6:

The controller 18 checks a user setting when it cannot communicate with the controller 24 in the video signal display apparatus 102.

The user setting is information on the video signal display apparatus 102 and set in advance, for example, by a user's operation through the operation unit 14 when the video signal reproducing apparatus 101 is connected to the video signal display apparatus 102. The user setting is stored, for example, in a storage unit that is not shown in FIG. 1.

How to set the user setting will be described.

For example, the model names of display apparatus connectable as the video signal display apparatus 102 are associated with information indicative of whether or not the models can display pseudo-interlaced signals, and the set of information is stored, for example, in a storage unit (not shown). For example, when the video signal reproducing apparatus 101 is connected to the video signal display apparatus 102, the model names of the display apparatus connectable as the video signal display apparatus 102 that are stored in the storage unit are listed on the display 15, and the user can operate the operation unit 14 and select the model name of the display apparatus actually connected. When the user operates the operation unit 14 and selects the model name of the connected display apparatus, information indicative of whether or not the display apparatus associated with the selected model name can display a pseudo-interlaced signal is stored, for example, in the storage unit. This information is referred to as the user setting.

Alternatively, when the model name of the connected display apparatus has not been pre-stored in the storage unit, the user operates the operation unit 14 and chooses whether or not the connected display apparatus performs a process using a plurality of frames in the temporal direction. The choice may be stored as the user setting.

Step ST7:

The controller 18 judges whether or not the video signal display apparatus 102 can display a pseudo-interlaced signal based on the information acquired from the controller 24 in the step ST5 or by checking the user setting in the step ST6.

When the controller 18 judges that the video signal display apparatus 102 can display a pseudo-interlaced signal, the control proceeds to the step ST10, otherwise the control proceeds to the step ST8.

Step ST8:

The controller 18 judges whether or not the video signal display apparatus 102 can change its display process setting.

Specifically, the controller 18 interrogates the controller 24 whether or not the setting that enables a process using a plurality of frames in the temporal direction (such as double-speed display and noise reduction), which compromises the display of a pseudo-interlaced signal, can be changed to the setting that disables the process.

When the setting can be changed, the control proceeds to the step ST9, otherwise the control proceeds to the step ST12.

Step ST9:

The controller 18 sends a control signal to the controller 24 to change the display process setting in the video signal display apparatus 102 to the setting that allows a pseudo-interlaced signal to be displayed. The control signal may be sent, for example, by using the corresponding one of the vendor specific commands in CEC of HDMI described above.

Step ST10:

The controller 18 instructs the pseudo-interlacing unit 16 to perform the pseudo-interlacing.

Step ST11:

The output unit 11 outputs the video signal that has undergone the pseudo-interlacing in the pseudo-interlacing unit 16 to the video signal display apparatus 102.

Step ST12:

The controller 18 instructs the pseudo-interlacing unit 16 not to perform the pseudo-interlacing.

Step ST13:

The output unit 17 outputs the progressive video signal that has not undergone the pseudo-interlacing in the pseudo-interlacing unit 16 but has undergone the IP conversion in the IP converter 13 to the video signal display apparatus 102.

Step ST14:

The output unit 17 outputs the progressive video signal decoded by the decoder 12 but having undergone no further processing to the video signal display apparatus 102.

As described above, according to the video signal display system 100 of the present embodiment, the video signal reproducing apparatus 101 judges whether the video signal read from the storage medium 11 and decoded by the decoder 12 is an interlaced video signal or a progressive video signal. When the video signal read from the storage medium 11 and decoded is a progressive video signal, the output unit 17 outputs the video signal as it is because the video signal display apparatus 102 capable of displaying progressive video signals can display the video signal as it is. When the video signal read from the storage medium 11 and decoded is an interlaced video signal, however, the IP converter 13 first performs IP conversion because the video signal display apparatus 102 cannot display the video signal as it is. The controller 18 then communicates with the controller 24 in the video signal display apparatus 102 to judge whether or not the video signal display apparatus 102 can display a pseudo-interlaced signal obtained by performing pseudo-interlacing on the progressive signal. When the video signal display apparatus 102 can display a pseudo-interlaced signal, the pseudo-interlacing unit 16 performs pseudo-interlacing. When the video signal display apparatus 102 cannot display a pseudo-interlaced signal, the pseudo-interlacing unit 16 does not perform pseudo-interlacing.

When the controller 18 in the video signal reproducing apparatus 101 cannot communicate with the controller 24 in the video signal display apparatus 102, the controller 18 judges in accordance with a user's operation through the operation unit 14 whether or not the video signal display apparatus 102 can display a pseudo-interlaced signal.

The thus configured video signal display system 100 of the present embodiment can avoid the situation in which a video signal display apparatus capable of displaying only progressive signals may not in some cases normally display a video signal obtained by performing pseudo-interlacing on a progressive signal obtained by IP-converting an interlaced signal. The situation in which a pseudo-interlaced video signal may not be normally displayed occurs, for example, when the video signal reproducing apparatus carries out a display process using a plurality of frames in the temporal direction, such as double-speed display and noise reduction.

The invention is not limited to the embodiment described above.

That is, when the invention is implemented, the components in the embodiment described above may be variously changed and replaced to the extent that the change and replacement are within the technical range of the invention or the range equivalent thereto.

In the embodiment described above, data read from the storage medium 11 are decoded by the decoder 12 into a video signal, but the invention is not necessarily implemented this way. For example, the decoder 12 may decode motion image data inputted through a network or a communication line into a video signal, which may then be used in the following processes.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal display system comprising:
a reproducing apparatus including
a decoder that decodes input video data to produce a video signal,
an IP converter that, when the video signal produced by the decoder is an interlaced video signal, converts the interlaced video signal into a progressive video signal,
a pseudo-interlacing unit that performs pseudo-interlacing in which the progressive video signal converted by the IP converter undergoes pseudo-interlacing so that the progressive video signal is converted into a pseudo-interlaced signal, and
a first controller; and
a display apparatus including
a display processor that carries out a display process for displaying a video signal, and
a display that can at least display the video signal that has undergone the display process in the display processor,
wherein the first controller acquires information indicative of whether or not the display processor carries out a display process using a plurality of frames in the video signal in the temporal direction, and controls the pseudo-interlacing unit not to perform the pseudo-interlacing when the display processor carries out the process using a plurality of frames in the video signal in the temporal direction, whereas controlling the pseudo-interlacing unit to perform the pseudo-interlacing when the display processor does not carry out any display process using a plurality of frames in the video signal in the temporal direction.

2. The video signal display system according to claim 1, wherein the display apparatus further includes a second controller, and
the first controller communicates with the second controller and acquires information indicative of whether or not the display processor carries out a process using a plurality of frames in the video signal in the temporal direction.

3. The video signal display system according to claim 1, wherein the reproducing apparatus further includes an operation unit, and
the first controller acquires information indicative of whether or not the display processor carries out a process using a plurality of frames in the video signal in the temporal direction based on an operation performed through the operation unit.

4. The video signal display system according to claim 2, wherein the display processor can set a display process using a plurality of frames in the video signal in the temporal direction to be or not to be carried out, and when the setting has been made so that the display processor carries out a display process using a plurality of frames in the video signal, the first controller communicates with the second controller and instructs the display processor to change the setting so that the display process using a plurality of frames in the video signal is not carried out.

5. A video signal reproducing apparatus comprising:
a decoder that decodes input video data to produce a video signal;
an IP converter that, when the video signal produced by the decoder is an interlaced video signal, converts the interlaced video signal into a progressive video signal;
a pseudo-interlacing unit that performs pseudo-interlacing in which the progressive video signal converted by the IP converter undergoes pseudo-interlacing so that the progressive video signal is converted into a pseudo-interlaced signal; and
a controller,
wherein the controller, when connected to a display apparatus capable of carrying out a display process for displaying a video signal, acquires information indicative of whether or not the display apparatus carries out a display process using a plurality of frames in the video signal in the temporal direction, and controls the pseudo-interlacing unit not to perform the pseudo-interlacing when the display apparatus carries out the process using a plurality of frames in the video signal in the temporal direction, whereas controlling the pseudo-interlacing unit to perform the pseudo-interlacing when the display apparatus does not carry out any display process using a plurality of frames in the video signal in the temporal direction.

6. A video signal display method comprising the steps of:
decoding input video data to produce a video signal;
converting the interlaced video signal into a progressive video signal when the video signal produced in the first step is an interlaced video signal;
judging whether or not a display processor that carries out a display process for displaying a video signal carries out a display process using a plurality of frames in the video signal in the temporal direction;
pseudo-interlacing the progressive video signal converted in the converting step so that the progressive video signal is converted into a pseudo-interlaced signal, when the display processor is not judged to carry out any display process using a plurality of frames in the video signal in the temporal direction; and
displaying the pseudo-interlaced signal converted in the pseudo-interlacing step.

* * * * *